United States Patent [19]

Shiomi

[11] Patent Number: 6,067,419
[45] Date of Patent: *May 23, 2000

[54] IMAGE BLUR PREVENTION APPARATUS

[75] Inventor: Yasuhiko Shiomi, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/592,675

[22] Filed: Jan. 26, 1996

[30] Foreign Application Priority Data

Jan. 27, 1995 [JP] Japan .................................. 7-011695

[51] Int. Cl.[7] .............................. G03B 1/18; G03B 17/00
[52] U.S. Cl. ................................................. 396/55
[58] Field of Search ..................... 354/432, 430; 348/208; 359/554; 358/105, 222; 396/52–55

[56] References Cited

U.S. PATENT DOCUMENTS

| | | | |
|---|---|---|---|
| 5,075,776 | 12/1991 | Cheung ................................. | 358/222 |
| 5,109,249 | 4/1992 | Katajima .............................. | 354/430 |
| 5,130,729 | 7/1992 | Sato et al. ............................ | 359/554 |
| 5,175,580 | 12/1992 | Shiomi ................................. | 354/410 |
| 5,198,896 | 3/1993 | Kondo et al. ........................ | 358/222 |
| 5,229,603 | 7/1993 | Shiomi ............................... | 250/231.1 |
| 5,237,365 | 8/1993 | Miyazawa ............................. | 354/430 |
| 5,309,190 | 5/1994 | Shinohara et al. ..................... | 396/55 |
| 5,337,098 | 8/1994 | Imafuji et al. ........................ | 354/430 |
| 5,365,303 | 11/1994 | Yamasaki et al. ..................... | 354/430 |
| 5,386,264 | 1/1995 | Sekine et al. ........................ | 354/430 |
| 5,444,509 | 8/1995 | Ohishi .................................. | 354/430 |
| 5,530,505 | 6/1996 | Ohishi et al. ......................... | 354/202 |

Primary Examiner—Safet Metjahic
Assistant Examiner—Michael Dalakis
Attorney, Agent, or Firm—Fitzpatrick, Cella, Harper & Scinto

[57] ABSTRACT

There is disclosed an image blur prevention apparatus which has a first means for sampling a first signal associated with image blur prevention, and a second means for performing an operation for forming a second signal used in image blur prevention of the image blur prevention apparatus on the basis of the signal sampled by the first means, at a frequency different from the sampling frequency of the first means. For example, the first means is set to sample the first signal (fluctuation detection signal) at a first period, and the second means is set to perform the operation for forming the second signal (a driving signal for operating an image blur prevention means) on the basis of a plurality of data sampled by the first means at different timings at a second period longer than the first period so as to cope with a high-frequency first signal, thereby improving the processing performance of a system for digitally processing a signal for image blur prevention, against a high-frequency first signal.

26 Claims, 10 Drawing Sheets

INTEGRAL $H(s) = \dfrac{V_{out}}{V_{in}} = \dfrac{1}{1 + SCR}$ $a_0 = \dfrac{\frac{1}{CR}}{\frac{1}{CR} + \frac{2}{T}}$ $a_1 = \dfrac{\frac{1}{CR}}{\frac{1}{CR} + \frac{2}{T}}$ $b_1 = \dfrac{\frac{1}{CR} - \frac{2}{T}}{\frac{1}{CR} + \frac{2}{T}}$ (T: SAMPLING TIME INTERVAL)

FIG. 6B

TIMING (T) SIGNAL DETECTION

↓

150 — B1 ← COEFFICIENT $b_1$

↓

151 — A0 ← COEFFICIENT $a_0$

↓

152 — A1 ← COEFFICIENT $a_1$

↓

153 — Y1 ← LAST TIME SAMPLING WORK DATA

↓

154 — Y0 ← X − B1 × Y1

↓

155 — U ← A0 × Y0 + A1 × Y1

↓

156 — NEXT TIME SAMPLING WORK DATA ← Y0

↓

157 — PHOTOGRAPHING OPTICAL SYSTEM LENS POSITION DETECTION

↓

158 — Z ← Z(i)

↓

159 — U ← U × Z

↓

160 — DADATA ← U

↓

PROCESSING FINISH

IMAGE BLUR PREVENTION APPARATUS

BACKGROUND OF THE INVENTION

1. Field of the Invention

The present invention relates to an apparatus used for preventing an image blur of an optical equipment such as a camera.

2. Related Background Art

Figure 9:
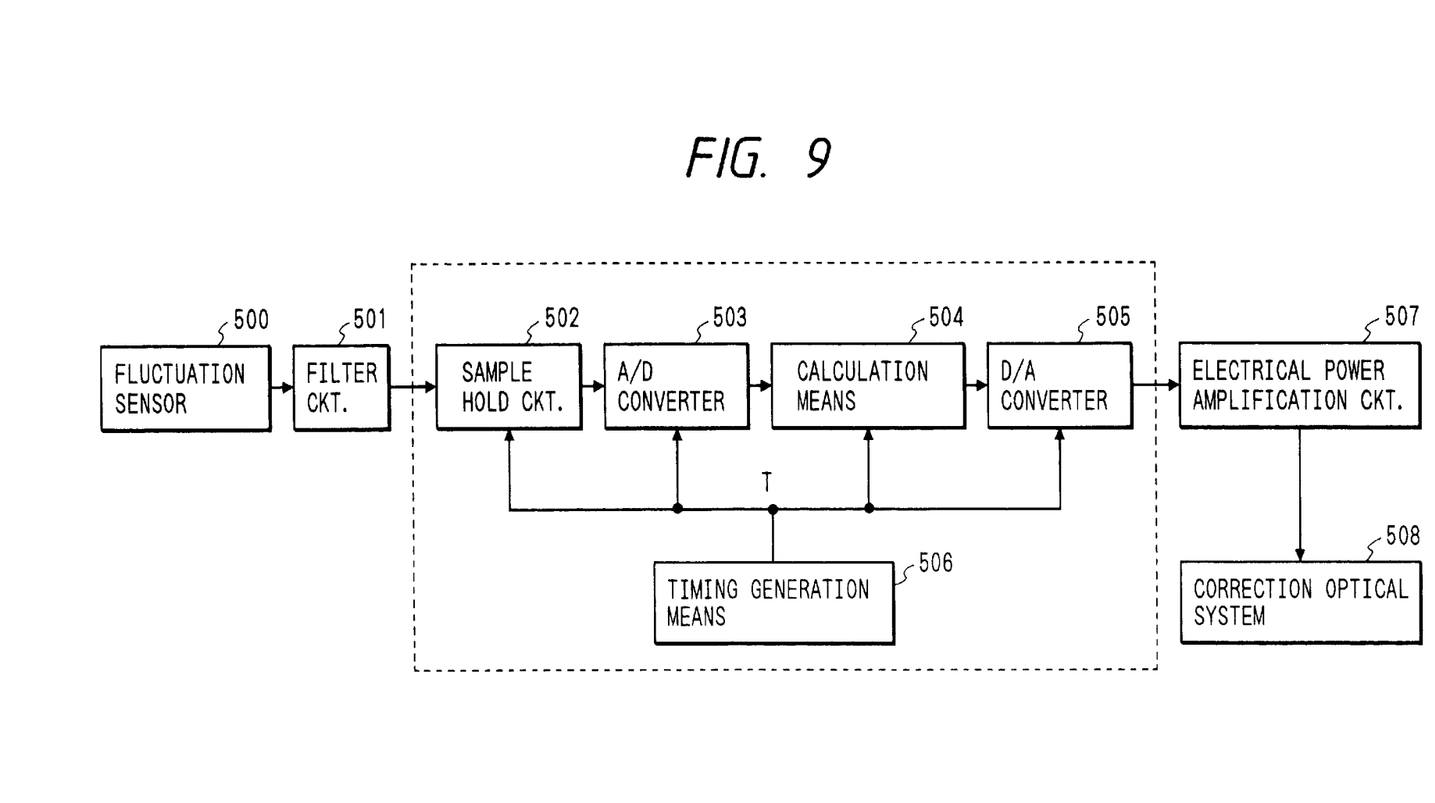
FIG. 9 is a block diagram showing the arrangement of a conventional image blur prevention system for a camera.

FIG. 9 shows a conventional image blur prevention system for preventing an image blur of a camera.

In the arrangement shown in FIG. 9, the output from a fluctuation (vibration) sensor 500 for detecting the hand vibration amount of the entire camera by a photographer is input to a filter circuit 501 so that an unnecessary DC component or the like is removed from the output from the sensor 500. Then, the output from the filter circuit 501 is input to a sample hold circuit 502. The sample hold circuit 502 samples the input signal at a predetermined time interval in synchronism with timing signals T generated at a predetermined time interval from a timing signal generation means 506, and transfers its output to an A/D converter 503.

Subsequently, the A/D converter 503 executes an A/D conversion operation of the input signal in synchronism with timing signals at the predetermined time interval, which are similar to the above-mentioned signals, and a calculation means 504 converts the digital data into driving data for driving a correction system (optical correction by driving a lens, image correction for changing the extraction timing of, e.g., a CCD, or the like) for correcting an actual fluctuation, on the basis of a predetermined calculation operation (to be described later).

The conversion result is converted into analog data again by a D/A converter 505, and electrical power corresponding to the level value of this analog signal is supplied to a correction system 508 via an electrical power amplification circuit 507 (which is not necessary in the case of image correction), thus driving the correction system. Note that the constituting means 502 to 506 surrounded by a dotted line can be normally realized by a single CPU.

As described above, the fluctuation sensor output (including the output from the correction system when the correction system is feedback-controlled) is sampled and A/D-converted at a predetermined time interval, calculation control is performed based on the digital data, and driving data are output at a predetermined time interval.

However, the conventional method must satisfy $t_1 + t_2 \leq T$ (where T is the sampling time interval, $t_1$ is the conversion time of the A/D converter, and $t_2$ is the calculation time). Since these times $t_1$ and $t_2$ are normally limited by the performance of a CPU, it is impossible to shorten the sampling time interval to be smaller than a certain time period.

In general, when the maximum frequency of an input signal is represented by $f_{max}$, a signal component having a frequency different from that of an original frequency component is generated in the sampling result (sampling theorem) unless the sampling time interval T is equal to or smaller than:

$$\frac{1}{2f_{max}}$$

For this reason, the upper limit value of T is undesirably limited to some extent. In the case of normal image blur prevention control, the sampling time interval is about 1 to 2 kHz in terms of frequency in consideration of the calculation performance of a normal microcomputer. In this case, a normal hand vibration signal has several ten Hz, while the fluctuation sensor may generate a signal of several kHz (for example, when a fluctuation gyro is used as a fluctuation sensor, a resonance frequency component between a vibration member and a support base appears) due to, e.g., a mechanical shock generated by the movement of a quick return mirror, travelling of a shutter, and the like of a single-lens reflex camera. When this signal is sampled at a normal sampling time interval, the original signal cannot often be reproduced.

Figure 10A:
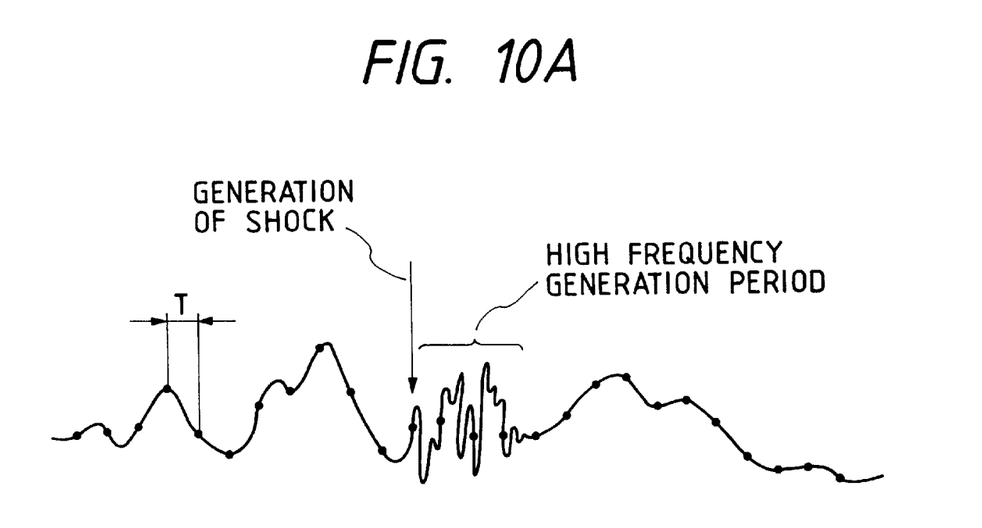
FIGS. 10A and 10B are waveform charts showing a fluctuation detection signal and the sampling/hold result of the detection signal.
Figure 10B:
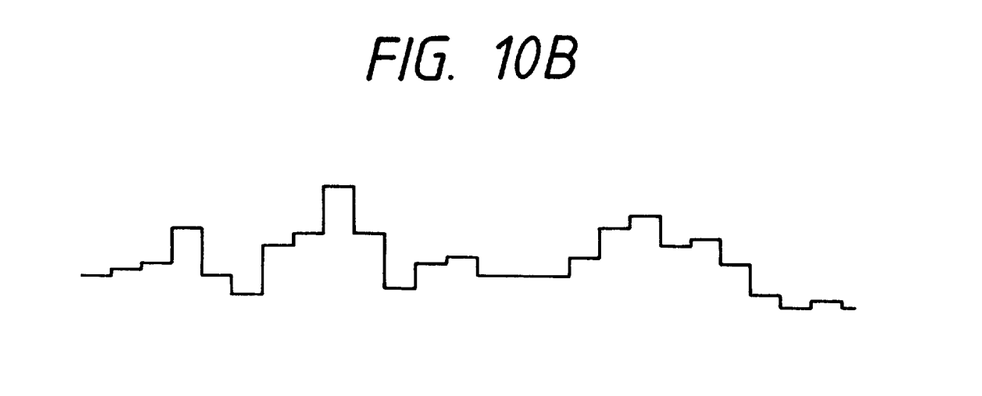

FIGS. 10A and 10B show this state. FIG. 10A shows an actual fluctuation signal, and FIG. 10B shows the sampling/hold result of the signal shown in FIG. 10A at the sampling time interval T. As can be seen from this waveform, in the sampling/hold result shown in FIG. 10B, high-frequency components such as a shock are not detected at all and the original hand vibration signal cannot be detected, either.

SUMMARY OF THE INVENTION

One aspect of the invention is to provide an image blur prevention apparatus which comprises first means for sampling a first signal associated with image blur prevention, and second means for performing an operation for forming a second signal used in image blur prevention of the image blur prevention apparatus, at a frequency different from the sampling frequency of the first means, a device to be applied to the image blur prevention apparatus, or an apparatus to which the image blur prevention apparatus is applied, thereby attaining an appropriate image blur prevention operation.

DETAILED DESCRIPTION OF THE PREFERRED EMBODIMENTS (First Embodiment)

Figure 1:
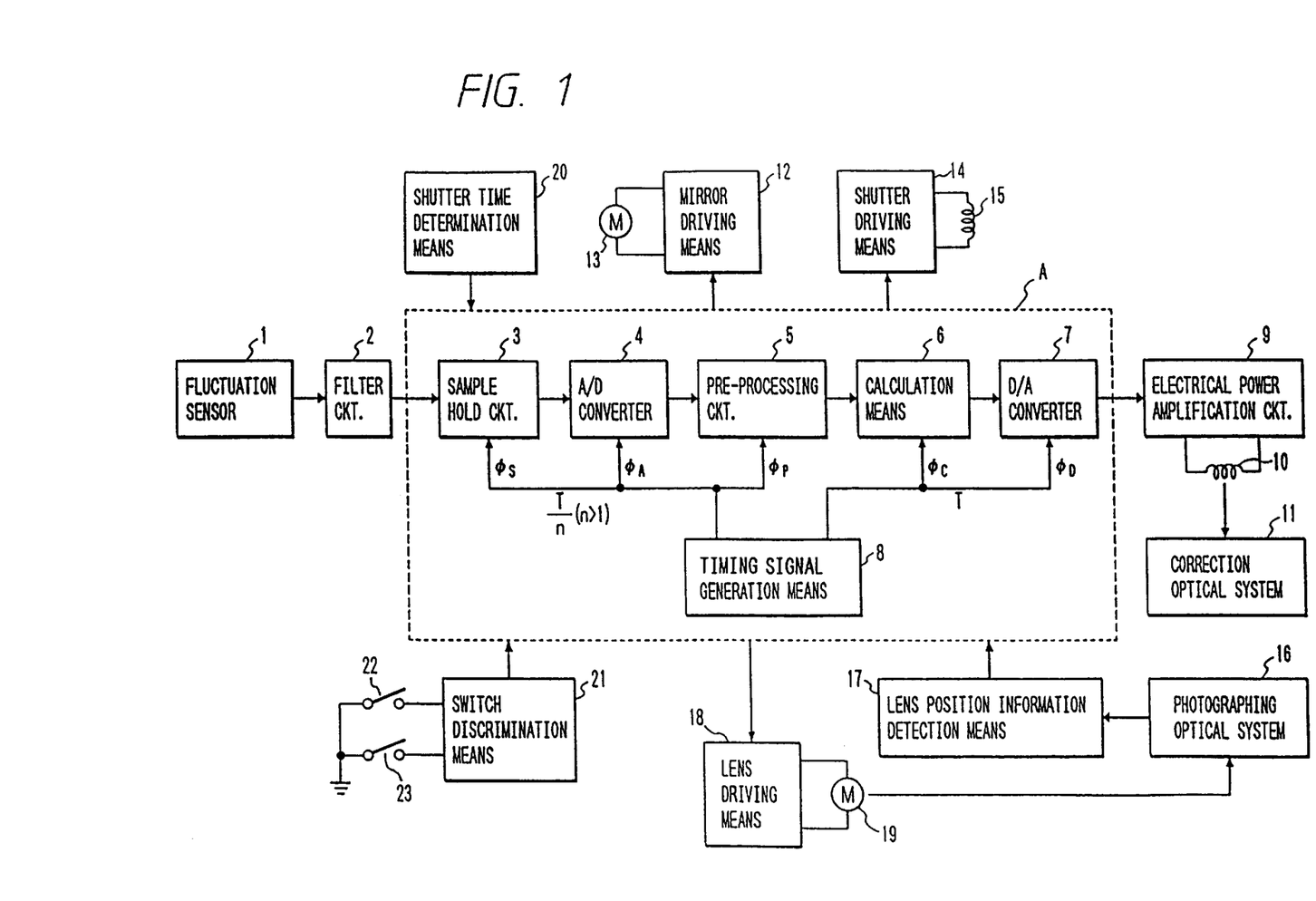
FIG. 1 is a schematic block diagram showing the arrangement of an image blur prevention apparatus according to the first embodiment of the present invention.

FIG. 1 is a schematic system block diagram showing the arrangement of an image blur prevention apparatus used in a camera according to an embodiment of the present invention.

Figure 2:
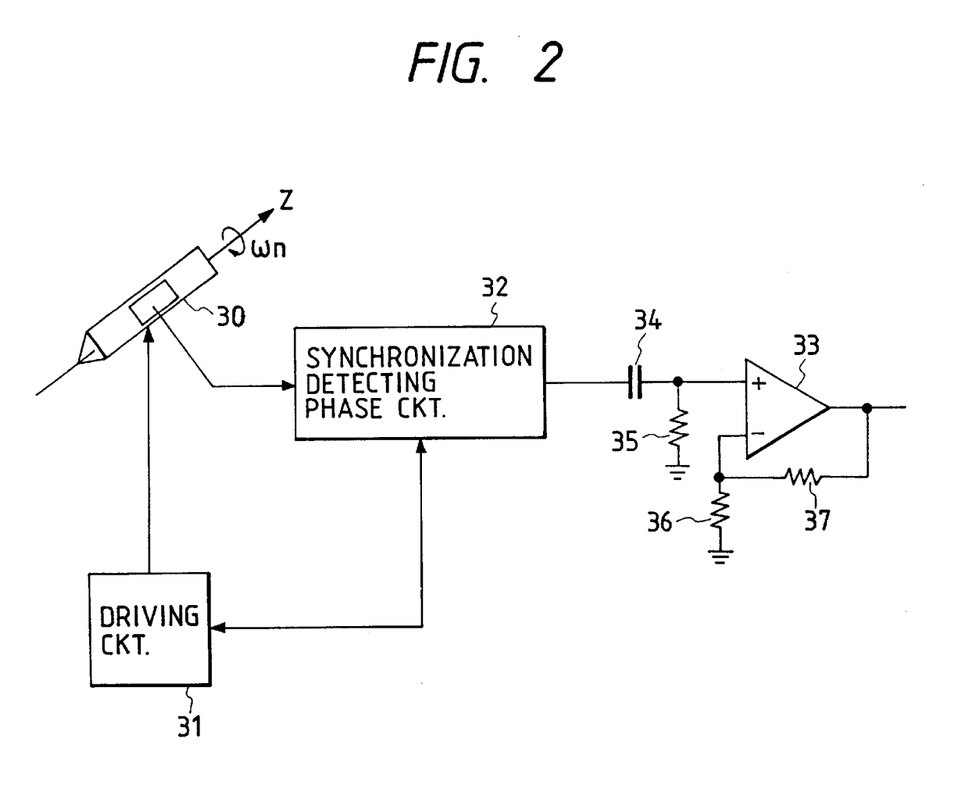
FIG. 2 is a diagram showing the arrangement of a fluctuation sensor shown in FIG. 1.

Referring to FIG. 1, a fluctuation (vibration) sensor 1 detects the fluctuation amount of the camera main body or the entire photographing lens with respect to an absolute space due to a hand vibration of a photographer. A filter circuit 2 removes unnecessary components (e.g., offset components different from the original fluctuation) from the output of the fluctuation sensor 1. FIG. 2 shows an arrangement which uses a fluctuation gyro as the fluctuation sensor 1 and a first-order high-pass filter as the filter circuit 2, as an example.

Referring to FIG. 2, a vibration member 30 is resonance-driven via a driving circuit 31 and a synchronization detecting phase circuit 32, and in this state, a rotational angular velocity on about the Z-axis is detected as a value proportional to the Coriolis force, as shown in FIG. 2. The detection signal from the vibration member 30 is demodulated by the synchronization detecting phase circuit 32, so that only an angular velocity signal component is extracted. Subsequently, the output from the circuit 32 is input to a high-pass filter constituted by an OP amplifier 33, a capacitor 34, and resistors 35, 36, and 37. The high-pass filter removes unnecessary DC components and the like from the detection signal.

Referring back to FIG. 1, the above-mentioned angular velocity signal is input to a sample hold circuit 3 via the output of the filter 2. The sampled hold circuit 3 samples input data at a predetermined time interval T/n in synchronism with timing signals $\phi_S$ from a timing signal generation means 8, and holds the sampled value until the next timing signal is generated. Note that the timing signal generation means 8 also outputs timing signals $\phi_A$, $\phi_P$, $\phi_C$, and $\phi_D$ to be described later in addition to the timing signal $\phi_S$.

The output data from the sample hold circuit 3 is input to an A/D converter 4, which A/D-converts the input data from analog data into digital data in synchronism with the timing signal $\phi_A$ output from the timing generation means 8. The conversion result from the A/D converter 4 is transferred as digital data to a pre-processing circuit 5 (to be described in detail later) in synchronism with the timing signal $\phi_P$ output from the timing signal generation means 8. The digital data is subjected to appropriate processing for reproducing actual fluctuation data in the pre-processing circuit.

FIGS. 4A to 4E show the operation timings of the sample hold circuit 3, the A/D converter 4, and the pre-processing circuit 5. The sample hold operation is performed in response to the leading edge of the timing signal $\phi_S$ from the timing signal generation means 8, the A/D conversion operation of the output from the sample hold circuit is started in response to the leading edge of the timing signal $\phi_A$, and the predetermined pre-processing of the A/D conversion result is executed in response to the leading edge of the timing signal $\phi_P$ from the timing signal generation means 8.

When the above-mentioned operations are repeated a plurality of times (four times in the timing charts shown in FIGS. 4A to 4E) in accordance with the timing signals $\phi_S$, $\phi_A$, and $\phi_P$ output from the timing signal generation means 8, the timing generation means 8 outputs the timing signal $\phi_C$, and the output result of the pre-processing circuit 5 is transferred to a calculation means 6 in synchronism with this signal. In calculation means 6, a calculation for driving a correction optical system 11 (to be described later) is executed at a predetermined time interval T.

The calculation result from the calculation means 6 is transferred to a D/A converter 7 in synchronism with the timing signal $\phi_D$ output from the timing generation means 8. The D/A converter 7 converts the input data into an analog voltage proportional to a current required for driving the correction optical system 11, and inputs the analog voltage to an electrical power amplification circuit 9. Since the electrical power amplification circuit 9 directly receives electrical power from a power supply battery (not shown), and its driving coil 10 receives electrical power via a driving transistor (not shown), the correction optical system 11 is driven by a force generated by the driving coil 10 and a magnetic circuit (to be described later) in a direction to correct the fluctuation.

Figure 3:
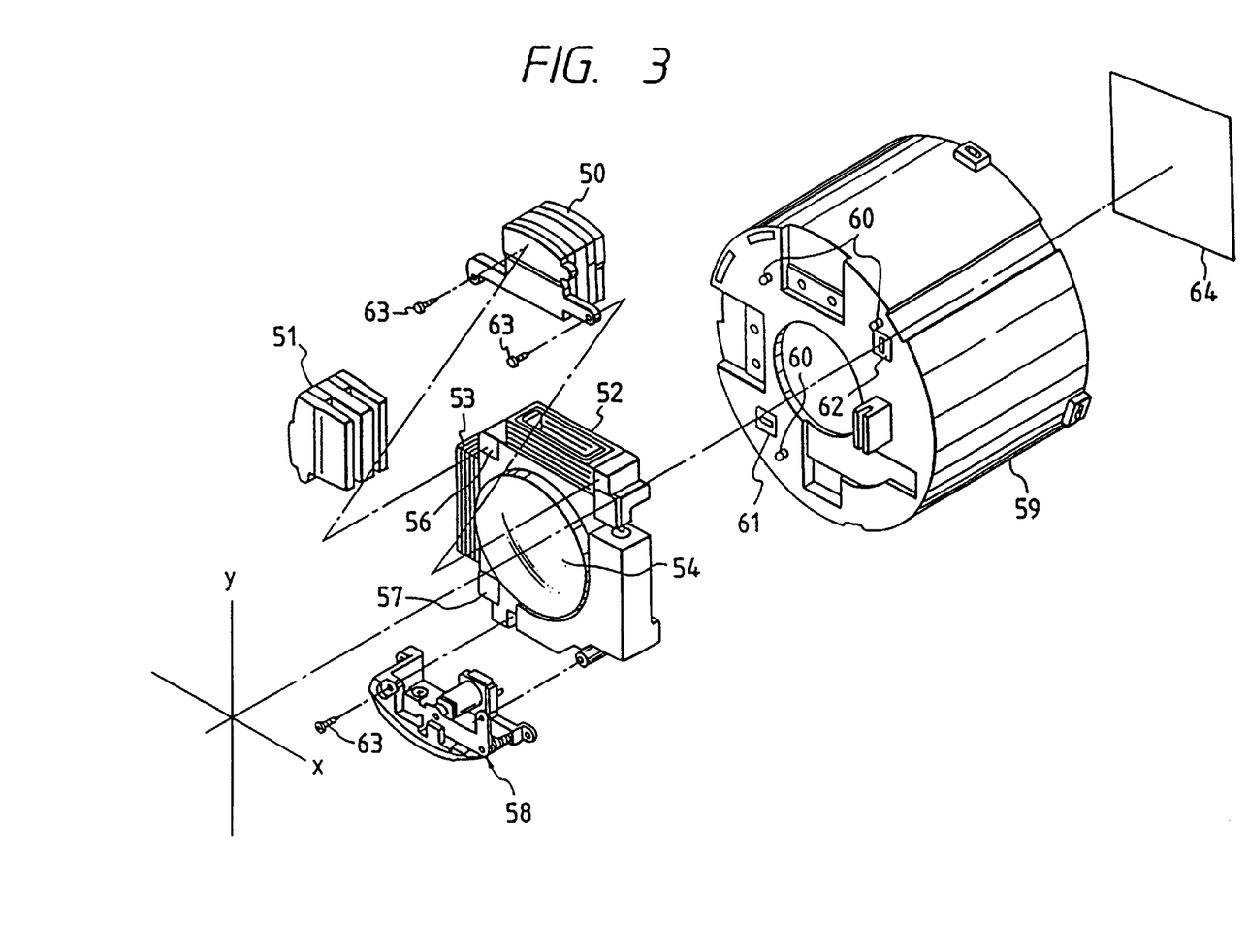
FIG. 3 is an exploded perspective view showing the arrangement of a correction optical system shown in FIG. 1.
Figure 4A:
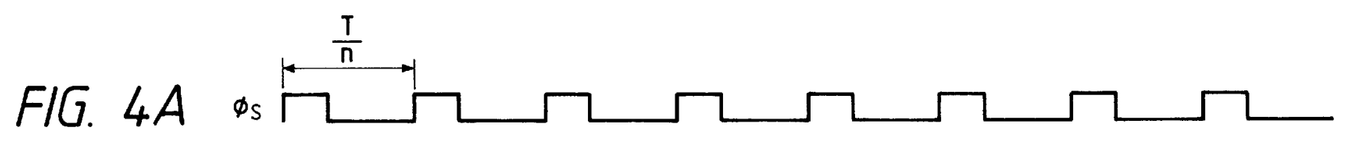
FIGS. 4A to 4E are timing charts showing the signal output state from a timing signal generation means shown in FIG. 1.
Figure 4B:
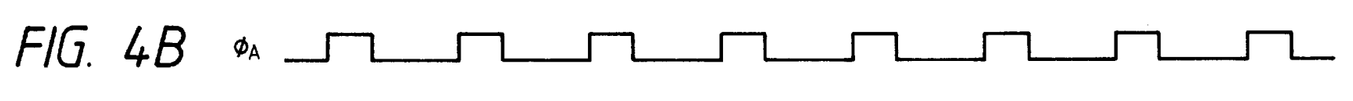
Figure 4C:
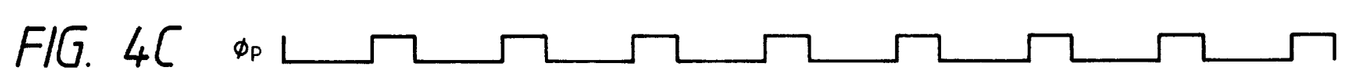
Figure 4D:
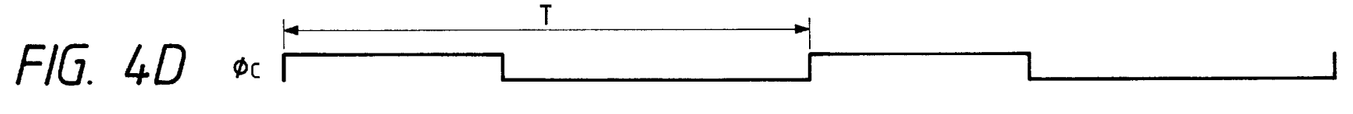
Figure 4E:
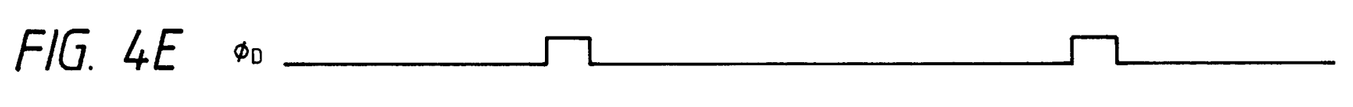

FIG. 3 shows the concrete arrangement of a shift optical system as an example of the correction optical system 11. In FIG. 3, yoke portions 50 and 51 respectively constitute actual magnetic circuit units in the x- and y-axis directions, and are respectively paired with driving coils 52 and 53. Therefore, when a predetermined current is supplied from the above-mentioned electrical power amplification circuit 9 to these coils, a shift lens 54 (corresponding to the correction optical system 11 in FIG. 1) constituting a portion of a photographing optical system 16 is translated in the x- and y-axis directions of a plane perpendicular to the optical axis, as shown in FIG. 3. Upon movement of the lens 54, a passing light beam is deflected, thereby changing the imaging position of the light beam on an imaging surface 64. For example, when the image blur prevention apparatus of this embodiment is arranged in a camera, a video camera, or the like, the imaging surface 64 corresponds to that of the camera, video camera, or the like. On the other hand, when the image blur prevention apparatus of this embodiment is arranged in an exchangeable lens, the imaging surface 64 corresponds to that of a camera which constitutes a system together with the exchangeable lens.

The actual movement of the shift lens 54 is optically/electrically detected by combinations of IREDs 56 and 57 which move integrally with the lens, and PSDs 61 and 62 which are fixed to a lens barrel portion 59 for holding the entire shift lens.

Furthermore, a mechanical lock mechanism 58 holds the lens 54 at substantially the central position to prevent the lens 54 from dropping due to gravity when power supply to the shift lens system is stopped. Also, charge pins 63 are attached to the yoke portions and the lock mechanism, and support balls 60 serve as tilt prevention members for regulating the shift lens system position in the inclination direction.

Referring back to FIG. 1, the above-mentioned sample hold circuit 3 to the timing signal generation means 8 are normally constituted by a single CPU, as indicated by a dotted line block A, and the general operations of the camera are performed by control commands from the CPU, as a matter of course.

A mirror driving means 12 energizes a motor 13 on the basis of a control signal from the CPU to perform an up/down operation of a mirror, and a shutter driving means 14 energizes a driving coil 15 on the basis of a control signal from the CPU to control the shutter curtains.

On the other hand, a lens driving means 18 energizes a motor 19 on the basis of a control signal from the CPU, and the zoom or focus driving operation of the photographing optical system 16 is performed with this driving power. In addition, the zoom/focus position of the optical system 16 is retrieved by the CPU via a lens position information detection means 17. A shutter time determination means 20 determines an actual shutter time, and this information is also retrieved by the CPU. A switch discrimination means 21 is connected to switches 22 and 23 corresponding to switches SW1 and SW2 of the release button of the camera, and the states of these switches are similarly retrieved by the CPU.

Figure 5:
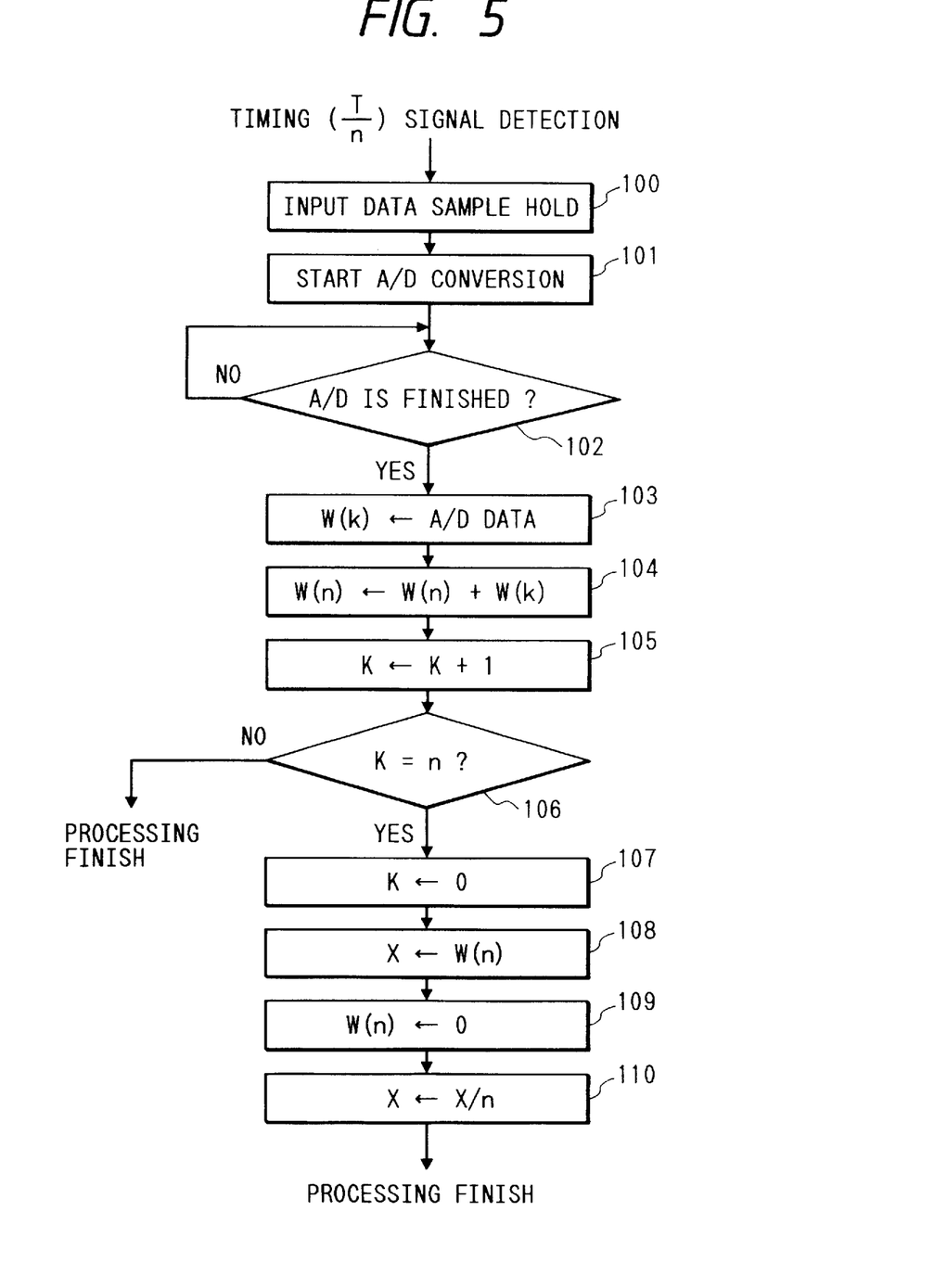
FIG. 5 is a flow chart showing the operation of a CPU.

The actual calculation processing method will be described below with reference to the flow chart showing the operation of the entire CPU. The flow chart shown in FIG. 5 shows interrupt processing executed when an interrupt is generated at a predetermined time interval T/n as in the timing signal generation means 8.

In step 100, the output from the filter circuit 2 corresponding to the output from the angular velocity (fluctuation) sensor 1 is sampled and held. In step 101, A/D conversion of the sampled/held value is started.

In step 102, it is checked if the A/D conversion is finished. When the conversion is finished, the A/D conversion result is latched by an internal memory W(k) (k is an integral value falling within the range from 0 to n) of the CPU in step 103. In step 104, the value W(k) is added to the contents of a memory W(n), and the sum is stored in the memory W(n).

In step 105, the value of a counter k for designating the memory address is incremented by 1. In step 106, it is checked if the counter value has reached a predetermined value n (for example, 4 in the example shown in FIGS. 4A to 4E above). If N "No" in step 106, the interrupt processing ends at that time.

However, if yes the value k becomes equal to the predetermined value n) the value of the counter k is reset to 0 in step 107, and the value of the memory W(n) is transferred to a calculation register X in step 108. Thereafter, the value of the memory W(n) is reset to 0 in step 109. At this time, the register X is set with the sum total of all values W(0) to W(n-1) obtained by repetitively sampling the input data a plurality of times.

In step 110, in order to calculate the average value of the sum, the quotient obtained by dividing the value of the register X with the number n of data values is set in the register X again. The above description corresponds to the operations of the sample hold circuit, the A/D converter, and the pre-processing circuit shown in FIG. 1.

The method of calculating actual correction system driving data will be explained below with reference to the flow chart shown in FIG. 6B.

Figure 6A:
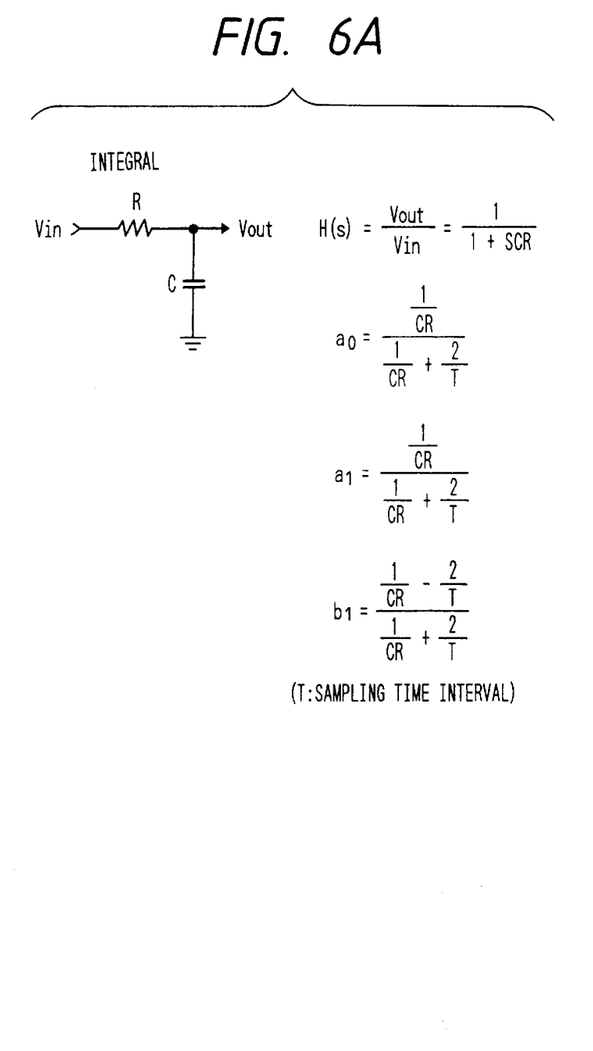
FIGS. 6A and 6B are respectively a diagram showing the arrangement of an integration circuit and a flow chart showing the operation of the CPU.
Figure 6B:
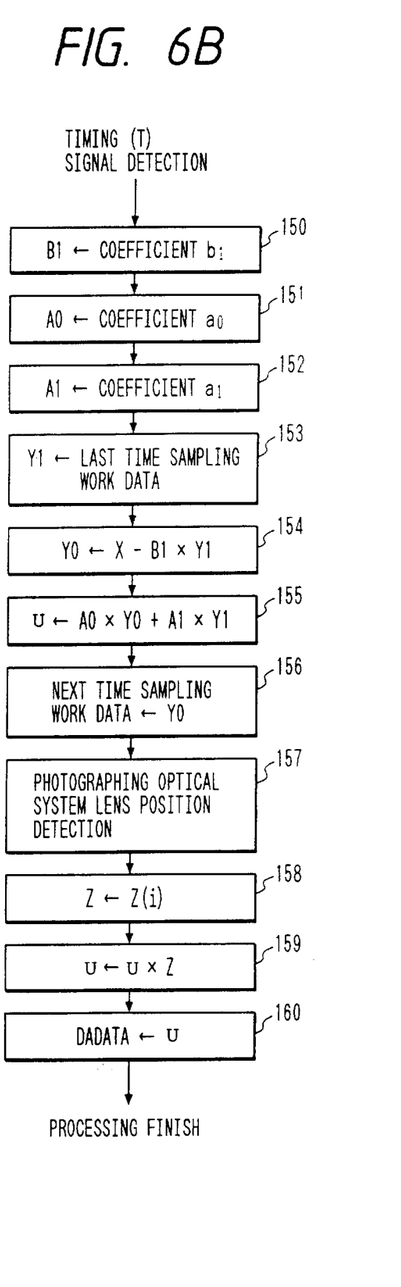

The flow chart in FIG. 6B shows interrupt processing executed when an interrupt is generated at a predetermined time interval T/n as in the timing signal generation means 8. In this case, a method of digitally calculating the integral of the value of the register X set with a value corresponding to the above-mentioned angular velocity output will be explained.

A general integration circuit used for this purpose comprises a first-order low-pass filter constituted by a resistor R and a capacitor C, as shown in FIG. 6A, and its transfer characteristics of this circuit are given by:

$$H(S) = \frac{V_{OUT}}{V_{IN}} = \frac{1}{1+SCR}$$

Furthermore, when the transfer characteristics are to be digitally realized, if the sampling time is represented by T and known s-z transformation is performed, constant values $a_0$, $a_1$, and $b_1$ are expressed by the following equations including C and R:

$$\begin{cases} a_0 = \dfrac{\dfrac{1}{CR}}{\dfrac{1}{CR}+\dfrac{2}{T}} \\ a_1 = \dfrac{\dfrac{1}{CR}}{\dfrac{1}{CR}+\dfrac{2}{T}} \quad (T: \text{sampling time interval}) \\ b_1 = \dfrac{\dfrac{1}{CR}-\dfrac{2}{T}}{\dfrac{1}{CR}+\dfrac{2}{T}} \end{cases}$$

In steps 150 to 152, the above-mentioned coefficients $b_1$, $a_0$, and $a_1$ are respectively set in internal registers B1, A0, and A1 of the CPU. In step 153, data in a RAM which is set with a value calculated at the last time sampling timing is transferred to a register Y1.

In step 154, the product of the values of the registers B1 and Y1 above is subtracted from the value of the register X storing a value which is finally calculated in the flow chart in FIG. 5, and corresponds to the average value of angular velocity data at the respective sampling timings, and the difference is set in a register Y0 in turn.

Furthermore, in step 155, in order to calculate a final integral output, the product of the values of the registers A0 and Y0 is added to the product of the values of the registers A1 and Y1, and the sum is set in a register U. In step 156, the value of the register Y0 is stored in the RAM as work data for the next interrupt timing. With the above-mentioned calculation operation, the angular velocity data is integrated to obtain displacement data. In practice, however, in order to convert the data into driving data for the correction system, various optical conditions must be taken into consideration.

In step 157, the position information of the photographing lens, i.e., the zoom or focus position is detected via the lens position information detection means 17. In step 158, each coefficient value Z(i) (i is a code corresponding to the position information) based on this information value is set in a register Z.

In step 159, the value of the register U set with the above-mentioned angular displacement data is multiplied with the value of the register Z set with the coefficient value based on the lens position information, and the product is set in the register U again. Furthermore, in step 160, this value is transferred to the portion of the D/A converter 7 as DADATA, thus ending the interrupt processing.

As described above, according to this embodiment, the output value from the fluctuation sensor 1 is sampled at higher speed than the repetition timing of the calculation for calculating data for driving the actual correction system (in practice, a larger number of calculations than those described in this embodiment are performed, and require a considerably long calculation time), and the average value of data obtained by a plurality of sampling operations is calculated in advance. Thereafter, the correction system driving data is calculated based on the average value. For this reason, even when a high-frequency signal generated by a mechanical shock is input, as shown in FIGS. 10A and 10B, since only the data sampling speed is high, only the high-frequency signal is averaged and removed, and the original hand vibration signal can be very accurately reproduced.

As a modification of the above-mentioned embodiment, the above-mentioned predetermined value n may be varied. For example, if n is increased, the generation period T/n of the timing signals $\phi_S$, $\phi_A$, and $\phi_P$ shown in FIGS. 4A to 4E is shortened, and the number n of sampling data used per average processing increases (i.e., the number of times of sampling performed during the predetermined time interval T increases), thus obtaining the average value with higher reliability.

On the other hand, the predetermined value n may be changed in correspondence with whether or not an exposure operation of the camera is performed (whether or not a recording operation is performed in the video camera), the photographing conditions such as the shutter speed, the zoom/focus state, and the like.

(Second Embodiment)

Figure 7:
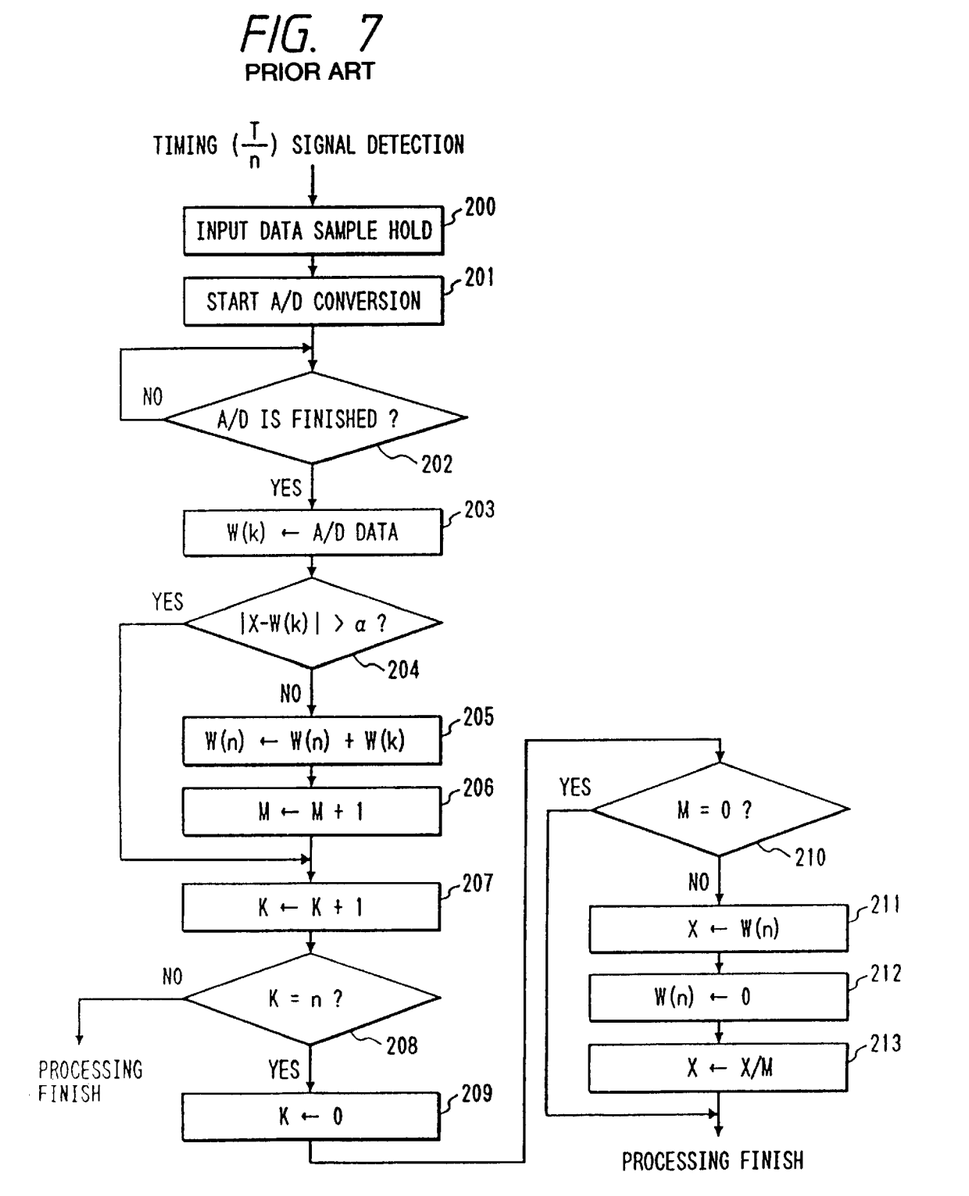
FIG. 7 is a flow chart showing the operation of a CPU according to the second embodiment of the present invention.

The operation according to the second embodiment of the present invention will be described below with reference to the flow chart in FIG. 7. The flow chart in FIG. 7 shows interrupt processing executed when an interrupt is generated by an internal timer of the CPU at a predetermined time interval T/n as in FIG. 5. Since steps 200 to 203 in FIG. 7 are the same as steps 100 to 103 in FIG. 5, a detailed description thereof will be omitted.

In step 204, it is checked if the absolute value of the difference between the value of the register X set with angular velocity data used in the last time calculation of the correction system driving data and the value of the memory W(k) which stores the A/D conversion result is larger than a predetermined value α. If "Yes" in step 204, the flow jumps to step 207; otherwise, the flow advances to step 205. In step 205, the value of the memory W(k) is added to the value of the memory W(n), and the sum is set in the memory W(n) again.

In step 206, the value of a register M for counting the number of data when the absolute value is smaller than α is incremented by 1. In step 207, the value of the counter k for counting the number of times of sampling is incremented by 1.

In step 208, it is checked if the counter value has reached the predetermined value n. If "No" in step 208, the interrupt processing ends at that time. However, if "yes" (when the value k becomes equal to the predetermined value n), the value of the counter k is reset to 0 in step 209, and it is checked in step 210 if the value of the register M for counting the number of effective data is 0. If "yes" in step 210, since there is no effective data, the last time value of the register X is directly used, and hence, the value of the register X is not updated, thus ending the processing.

On the other hand, if "No" (" it is determined in step 210 that the value of the register M is not 0, the value of the memory W(n) set with the sum total of effective data obtained by a plurality of sampling operations is transferred to the register X in step 211, and the value of the memory W(n) is reset to 0 in step 212.

In step 213, the value of the register X is divided with the value of the register M set with the number of effective data, and the quotient is set in the register X again.

As described above, according to this embodiment, of a plurality of sampling data, data which has an extremely different value from other data (in this embodiment, data which has a value different from that of data used for the last time correction driving by a predetermined value or more) is not used in the calculation of average data since it has low reliability as data representing the fluctuation state. For this reason, as compared to simple average processing, a signal can be extracted more accurately.

Note that the value a need always be fixed, but may be varied in correspondence with the degree of variation of all data. On the other hand, the value α may be changed in correspondence with whether or not an exposure operation of the camera is performed (whether or not the recording operation is performed in the video camera), the photographing conditions such as the shutter speed, the zoom/focus state, and the like.

(Third Embodiment)

Figure 8:
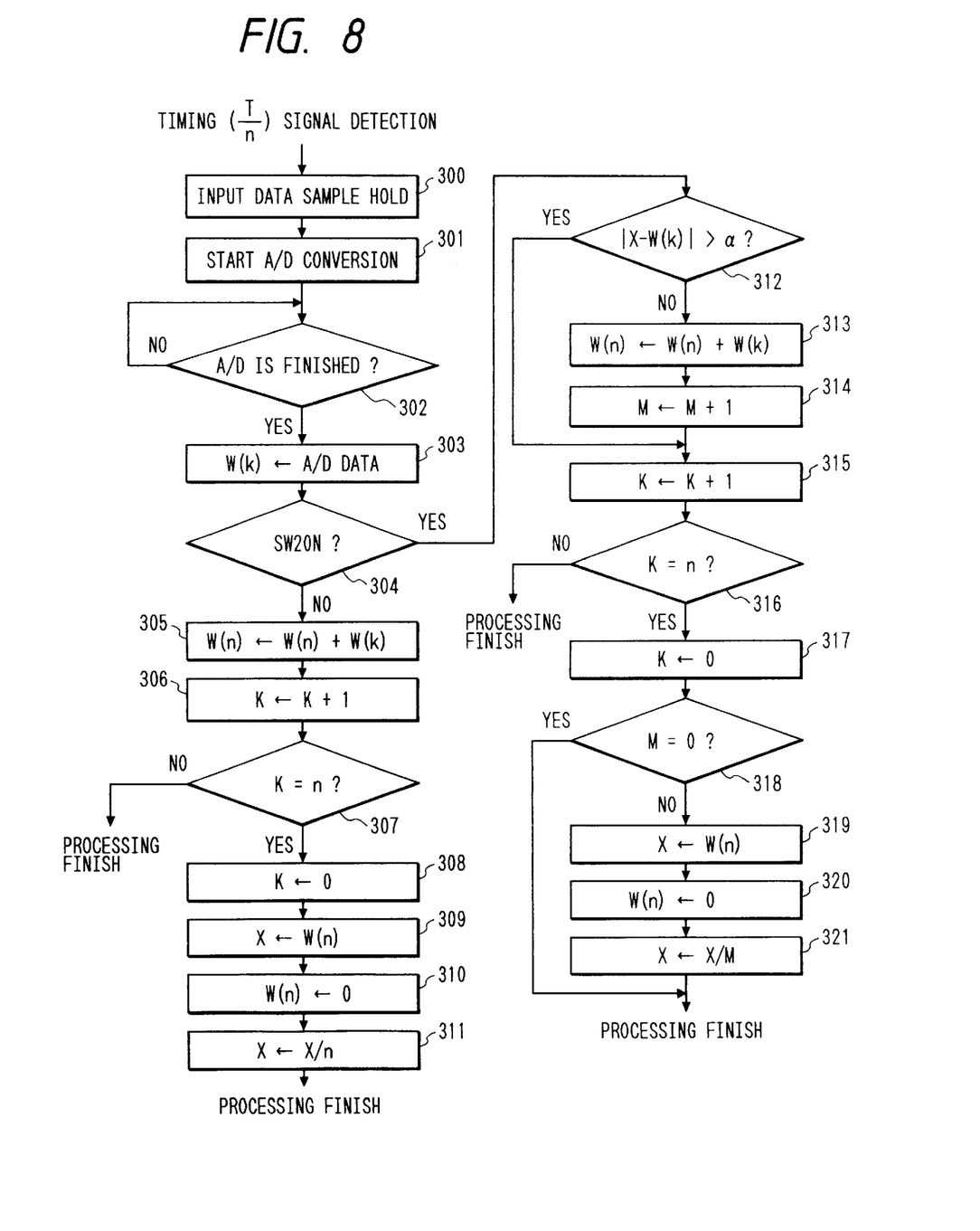
FIG. 8 is a flow chart showing the operation of a CPU according to the third embodiment of the present invention.

The operation according to the third embodiment of the present invention will be described below with reference to the flow chart in FIG. 8. The flow chart in FIG. 8 shows interrupt processing executed when an interrupt is generated by an internal timer of the CPU at a predetermined time interval T/n as in FIG. 5. Since steps 300 to 303 in FIG. 8 are the same as steps 100 to 103 in FIG. 5, a detailed description thereof will be omitted.

In step 304, it is checked if the switch SW2 (not shown) of the camera is turned on, i.e., if the release sequence is started. If the switch SW2 is OFF, i.e., if the photographer is performing an operation for determining the framing of an object, processing in steps 305 to 311 is executed. The subsequent operations in steps 305 to 311 are the same as steps 104 to 110 in the flow chart in FIG. 5. That is, a simple average operation of a plurality of sampling data is performed.

On the other hand, if it is determined in step 304 that the switch SW2 is ON, it is determined that a release sequence is started, i.e., the mirror and the shutter shown in FIG. 1 are about to be driven, and the processing method is changed. That is, processing in steps 312 to 321 is executed.

The operations in steps 312 to 321 are the same as steps 204 to 213 in FIG. 7. That is, processing for excluding data, which is a sampling result extremely different from angular velocity data used in the last time correction system driving, from data to be averaged is executed.

As described above, in this embodiment, the influence of a high-frequency signal caused by a mechanical shock generated at a timing near the exposure operation is eliminated by an optimal method (i.e., reproducibility of an original hand vibration signal when the high-frequency signal is removed by the filter). The processing method may be changed on the basis of, e.g., the shutter speed of the camera for defining the exposure time, or the zoom/focus state, in addition to the state of the switch SW2.

Note that this embodiment may be applied to a video camera. In this case, it is checked in step 304 in FIG. 8 if a recording operation is performed.

The present invention can be applied to a single-lens reflex camera, a lens shutter camera, a video camera, an optical or non-optical equipment other than the camera, and a constituting unit of a given apparatus.

The present invention is not limited to specific fluctuation detection means and may use an angular accelerometer, an accelerometer, an angular velocimeter, a velocimeter, an angular displacement meter, a displacement meter, a method of detecting the fluctuation itself of an image, and the like, as long as a fluctuation can be detected.

The present invention is not limited to specific image blur prevention means and may use a shift optical system for moving an optical member in a plane perpendicular to the optical axis, beam changing means such as a variable angle prism, means for moving the photographing surface in a plane perpendicular to the optical axis, means for correcting an image blur by image processing, and the like, as long as an image blur can be prevented.

In the present invention, the respective embodiments and their technical elements may be combined as needed.

Furthermore, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Also, the individual components shown in schematic or block form in the Drawings are all well-known in the camera arts and their specific construction and operation are not critical to the operation or best mode for carrying out the invention.

In the present invention, the respective embodiments and their technical elements may be combined as needed.

In the present invention, the entire arrangement or a portion thereof of claims or the embodiments may form a single apparatus, may be combined with other apparatuses, or may be an element constituting an apparatus.

The present invention may be applied to various types of cameras such as a single-lens reflex camera, a lens shutter camera, a video camera, and the like, an optical or non-optical equipment other than the camera, a device applied to these cameras and optical and non-optical equipments, and an element constituting them.

What is claimed is:

1. An apparatus adapted to an image blur correction device in which a movable member moves to shift an image formed on an imaging surface to compensate for image blur in accordance with a fluctuation signal representative of a fluctuation that causes image blur, said apparatus comprising:

a sampling portion that samples the fluctuation signal substantially at every first period and produces a fluctuation sample signal;

a selection portion that monitors the fluctuation sample signal produced by said sampling portion, determines whether the fluctuation sample signal produced by said sampling portion contains a predetermined condition, and selects first signals representing fluctuation sample signals containing the predetermined condition and other signals representing fluctuation sample signals not containing the predetermined condition; and a calculation portion that performs a calculation based on fluctuation sample signals produced by said sampling portion and selected by said selection portion as first signals containing the predetermined condition, said calculation portion forming a driving signal for driving said movable member to perform image blur correction, said calculation portion performing the calculation every second period, greater than the first period.

2. An apparatus according to claim 1, further comprising a driving control portion that drives the image blur correction device in accordance with the driving signal formed by said calculation portion.

3. An apparatus according to claim 2, wherein said driving control portion comprises means for varying a moving state of said movable member in response to the driving signal during a time when the image blur correction device is performing an image blur correction operation.

4. An apparatus according to claim 1, wherein said calculation portion comprises means for forming the driving signal in accordance with a state of the fluctuation.

5. An apparatus according to claim 1, wherein said calculation portion comprises means for forming the driving signal on the basis of an average value of a plurality of signal samples.

6. An apparatus according to claim 1, wherein said sampling portion samples a signal corresponding to an image blur state.

7. An apparatus according to claim 1, wherein said calculation portion comprises means for forming said driving signal in accordance with a setting state of an optical system used with said image blur correction device.

8. An apparatus according to claim 4, wherein said selection portion comprises varying means for changing a signal used for forming the driving signal using signal samples sampled by said sampling portion.

9. An apparatus according to claim 8, wherein said selection portion comprises means for selecting only a signal in a predetermined state of the signal samples sampled by said sampling portion.

10. An apparatus according to claim 8, wherein said varying means comprises means for performing a signal changing operation in accordance with whether or not an image recording operation is performed.

11. An apparatus according to claim 8, wherein said varying means comprises means for performing a signal changing operation on the basis of an image recording time.

12. An apparatus according to claim 8, wherein said varying means comprises means for performing a signal changing operation in accordance with a state of an optical system.

13. An apparatus according to claim 1, wherein said sampling portion includes means for performing said sampling in synchronism with a predetermined signal generated at a predetermined frequency.

14. An apparatus according to claim 1, wherein said calculation portion includes means for performing a driving control operation in synchronism with a predetermined signal generated at a predetermined frequency.

15. An apparatus according to claim 13, further comprising signal generating means for generating said predetermined signal at said predetermined frequency.

16. An apparatus according to claim 14, further comprising signal generating means for generating said predetermined signal at said predetermined frequency.

17. An apparatus according to claim 1, wherein said sampling portion includes means for performing said sampling in synchronism with a first signal generated at a first frequency and said calculation portion includes means for performing a driving control operation in synchronism with a second signal generated at a second frequency different from the first frequency of said first signal.

18. An apparatus according to claim 1, wherein said calculation portion includes means for outputting a driving control signal for driving said image blur correction device to a driving device for driving said image blur correction device at a frequency different from a sampling frequency of said sampling portion.

19. An apparatus according to claim 1, wherein said movable member includes a movable optical member movable in an optical path to correct image blur.

20. An apparatus according to claim 19, wherein said movable optical member includes means for deflecting a light beam to correct image blur.

21. An apparatus according to claim 7, wherein said calculation portion includes means for forming said driving signal in accordance with a focus length setting state or a setting state for a focus adjustment of an optical system used with said image blur correction device.

22. An apparatus according to claim 1, wherein said selection portion determines whether a value of the frequency sample signal satisfies the predetermined condition.

23. An image blur correction apparatus comprising:

an image blur correction device, in which a movable member moves to shift an image formed on an imaging surface to compensate for image blur in accordance with a fluctuation signal representative of a fluctuation that causes image blur;

a sampling portion that samples the fluctuation signal substantially at every first period and produces a fluctuation sample signal;

a selection portion that monitors the fluctuation sample signal produced by said sampling portion, determines whether the fluctuation sample signal produced by said sampling portion contains a predetermined condition, and selects first signals representing fluctuation sample signals containing the predetermined condition and other signals representing fluctuation sample signals not containing the predetermined condition; and a calculation portion that performs a calculation based on fluctuation sample signals produced by said sampling portion and selected by said selection portion as first signals containing the predetermined condition, said calculation portion forming a driving signal for driving said movable member to perform image blur correction, said calculation portion performing the calculation every second period, greater than the first period.

24. An image blur correction apparatus according to claim 13, wherein said selection portion determines whether a value of the frequency sample signal satisfies the predetermined condition.

25. An optical equipment to which an image blur correction apparatus is adapted, the image blur correction apparatus comprising an image blur correction device, in which a movable member moves to shift an image formed on an imaging surface to compensate for image blur in accordance with a fluctuation signal representative of a fluctuation that causes image blur, said optical equipment comprising:

a sampling portion that samples the fluctuation signal substantially at every first period and produces a fluctuation sample signal;

a selection portion that monitors the fluctuation sample signal produced by said sampling portion, determines whether the fluctuation sample signal produced by said sampling portion contains a predetermined condition, and selects first signals representing fluctuation sample signals containing the predetermined condition and other signals representing fluctuation sample signals not containing the predetermined condition; and a calculation portion that performs a calculation based on fluctuation sample signals produced by said sampling portion and selected by said selection portion as first signals containing the predetermined condition, said calculation portion forming a driving signal for driving said movable member to perform image blur correction, said calculation portion performing the calculation every second period, greater than the first period.

26. An optical equipment according to claim 14, wherein said selection portion determines whether a value of the frequency sample signal satisfies the predetermined condition.

* * * * *

UNITED STATES PATENT AND TRADEMARK OFFICE
CERTIFICATE OF CORRECTION

PATENT NO. : 6,067,419
DATED      : May 23, 2000
INVENTOR(S): YASUHIKO SHIOMI

Page 1 of 2

It is certified that error appears in the above-identified patent and that said Letters Patent is hereby corrected as shown below:

Column 2

Line 4, "ten" should read --tens of--.

Column 3

Line 57, "timing" should read --timing signal--.
    Line 65, "timing" should read --timing signal--.

Column 4

Line 45, "to" should read --and--.

Column 5

Line 24, "N "No" should read --"No"--.
    Line 26, "yes the" should read --"yes" (the--.

Column 7

Line 48, "0," should read --0),--.
    Line 53, "with" should read --by--.
    Line 65, "need" should read --need not--.

UNITED STATES PATENT AND TRADEMARK OFFICE
CERTIFICATE OF CORRECTION

PATENT NO.  : 6,067,419
DATED       : May 23, 2000
INVENTOR(S) : YASUHIKO SHIOMI

It is certified that error appears in the above-identified patent and that said Letters Patent is hereby corrected as shown below:

Column 8

Line 20, "as" should read --as in--.

Column 9

Line 9, "Drawings" should read --drawings--.

Column 11

Line 28, "13," should read --23,--.

Column 12

Line 27, "claim 14," should read --claim 25,--.

Signed and Sealed this

Twenty-fourth Day of April, 2001

Attest:

NICHOLAS P. GODICI

*Attesting Officer*   *Acting Director of the United States Patent and Trademark Office*